(12) United States Patent
Alfredsson

(10) Patent No.: US 6,824,493 B2
(45) Date of Patent: Nov. 30, 2004

(54) SYNCHRONIZATION DEVICE OF LOCKING RING TYPE

(75) Inventor: Sverker Alfredsson, Vastra Frolunda (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/604,736

(22) Filed: Aug. 13, 2003

(65) Prior Publication Data

US 2004/0106492 A1 Jun. 3, 2004

Related U.S. Application Data

(63) Continuation-in-part of application No. PCT/SE02/00247, filed on Feb. 13, 2002.

(30) Foreign Application Priority Data

Feb. 13, 2001 (SE) .............................................. 0100453

(51) Int. Cl.[7] ................................................. F16H 3/44
(52) U.S. Cl. ...................................... 475/299; 475/303
(58) Field of Search ................................. 475/299, 303

(56) References Cited

U.S. PATENT DOCUMENTS 4,667,538 A * 5/1987 Larsson ...................... 475/299
5,390,347 A * 2/1995 Buri et al. .................. 475/303

FOREIGN PATENT DOCUMENTS

| SE | 450944 B | 8/1987 |
|---|---|---|
| SE | 514231 C2 | 1/2001 |
| WO | WO 9620359 A1 | 7/1996 |

* cited by examiner

*Primary Examiner*—Dirk Wright
(74) *Attorney, Agent, or Firm*—Novak Druce LLP

(57) ABSTRACT

Method and arrangement for providing a synchronization device that is provided in a range gear assembly within planetary gearing in a vehicle. During synchronization and gear changing, at least one spring suspension element (28, 34, 46) transmits bearing force from the clutch sleeve to the synchronization ring by means of cooperation with first recesses (32, 33, 47, 48) in the clutch sleeve (18). The clutch sleeve, clutch rings, synchronization ring and spring suspension elements are provided on one side of the ring gear (14). The synchronization ring (24, 45) is constructed together with an additional mirror-inverted synchronization ring in order to form a double synchronization ring (24, 45). The clutch sleeve (18), during its axial movement for engagement of gear, separates the friction surfaces (23, 36, 26, 37) in the synchronization device to the gear, which becomes disengaged by means of the fact that at least one second recess (42, 43, 49) is provided on the double synchronization ring (45) and that a spring suspension element (46) cooperates with the second recess (42, 43, 49) as well.

5 Claims, 2 Drawing Sheets

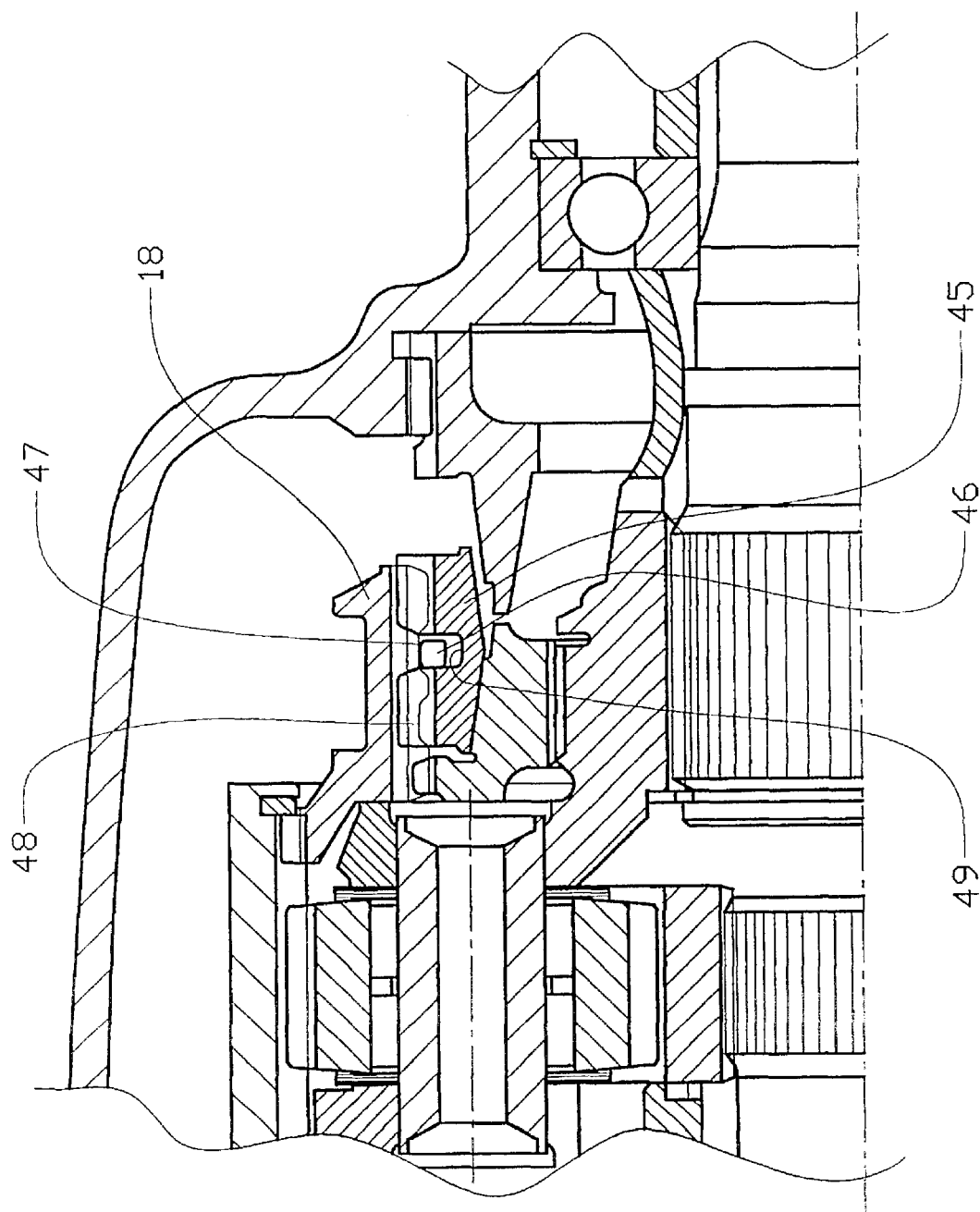

SYNCHRONIZATION DEVICE OF LOCKING RING TYPE

CROSS REFERENCE TO RELATED APPLICATIONS

This present application is a continuation-in-part patent application of International Application No. PCT/SE02/00247 filed Feb. 13, 2002 which was published in English pursuant to Article 21(2) of the Patent Cooperation Treaty, and which claims priority to Swedish Application No. 0100453-0 filed Feb. 13, 2002. Both applications are expressly incorporated herein by reference in their entireties.

BACKGROUND OF INVENTION

1. Technical Field

The present invention relates to a synchronization device, which is provided in a gear arrangement forming part of a vehicle transmission.

2. Background

A gear box in a vehicle transmission usually has an input rotating shaft and an output rotating shaft. The principal object is to transmit rotation with the possibility of selecting between various rotational gear ratios between the input and output shafts.

The document SE 514231 C2, corresponding to US2003/0110876 A1 and the disclosure of which is expressly incorporated herein by reference, discloses a type of a previously known range gear box of the planetary gearing type, where the ring gear itself is utilized as a clutch sleeve. The ring gear is axially displaceable between a high-range position and a low-range position. A first clutch ring is fixedly connected with a range gear housing and a second clutch ring is fixedly connected with an input shaft of the range gear box. Synchronization rings are provided on either side of the ring gear. On each respective synchronization ring, a garter spring is provided, the purpose of which is to transmit bearing force from the ring gear to the synchronization ring during synchronization and gear changing by means of cooperation with recesses in the ring gear. During a change of the gears, for example from low-range position (low gear) and a large gear ratio to high-range position (high gear) and a smaller gear ratio, the rate of rotation of the ring gear must be adjusted to the rate of rotation of the input shaft before it can be locked to, or be engaged with the input shaft. This is achieved by means of the fact that a bearing force is applied to the ring gear in an axial direction towards the synchronization ring for high-range; i.e., the synchronization ring must adjust the rotation of the ring gear to the rate of rotation of the input shaft. When synchronization of the rotation speed has been achieved, the ring gear is locked to the input shaft because the ring gear now can be axially displaced and engage with the clutch ring for high-range, which clutch ring is rotationally connected with the input shaft. By means of bars for conveyance, which are provided on both synchronization rings, these will always rotate with the ring gear even when the ring gear is axially displaced in relation to the respective synchronization ring. During synchronization and gear changing, the respective garter spring transmits bearing force from the ring gear to the respective synchronization ring by means of cooperation with recesses in the ring gear. Planet wheels are provided on a planet carrier. During its axial movement for engagement of gear, the ring gear will separate the friction surfaces in the synchronization to the gear which is disengaged. This is provided by means of axial surfaces in the recesses on the synchronization ring and the recesses on the ring gear cooperate with the respective garter spring and thereby pull apart the friction surfaces of the clutch ring and the synchronization ring, respectively. Friction losses from trailing synchronization rings are eliminated, which results in a fuel saving. At the same time, the wear on the friction surfaces is also reduced. The synchronization device according to the document SE 514231 C2 results in a wide ring gear and a small freedom to optimize synchronization details and ring gear teeth since they are mutually dependent.

The document SE 450944 B1, corresponding to U.S. Pat. No. 4,667,538 and the disclosure of which is expressly incorporated herein by reference, discloses another example of a two-geared synchronized gear arrangement in a range gear box of the planetary gearing type, where the synchronization for each gear is constituted by a clutch ring, a synchronization ring which cooperates with the clutch ring by means of friction surfaces and is axially displaceable, which synchronization ring is arranged to rotate with an axially displaceable clutch sleeve, and a spring suspension element in the form of a garter spring. In this type of synchronization device, the entire synchronization device is provided on one side of the ring gear of the planetary gearing, which ring gear is fixed to the clutch sleeve. In this case as well, garter springs transmit bearing force from the sleeve to the synchronization ring during synchronization and gear changing by means of cooperation with recesses in the clutch sleeve. In this case as well, a change of gears takes place in a manner which is similar to that for the device according to the document SE 514231 C2. Corresponding bars for conveying both synchronization rings result in that these always rotate with the clutch sleeve even when the clutch sleeve is displaced axially in relation to the respective synchronization ring. This implies that the synchronization ring, which at the moment does not have its rate of rotation adjusted to the associated clutch ring, will lie and trail against its associated clutch ring. Due to the fact that the rates of rotation are different on the synchronization ring and the clutch ring for the non-engaged gear, this results in friction losses as the cone-shaped friction surfaces glide against each other.

The synchronization rings in the document SE 450944 B1 are axially displaceable in relation to the clutch ring and the clutch sleeve. As a result, when the vehicle in which the gear arrangement is provided travels on, for example, uphill slopes or downhill slopes, one of the synchronization rings will trail against its clutch ring, more or less, depending on which axial direction it moves as a result of the force of gravity.

For a similar device as the device for heavy diesel vehicles which is exemplified in the document SE 450944 B1, an average counteracting moment of approximately 2 Nm has been measured from the trailing synchronization ring for low-range, which corresponds to approximately 1 cl diesel fuel per 10 km.

The synchronization device according to the document SE 450944 B1 is also composed of many parts and is therefore comparatively expensive to manufacture and assemble.

Thus, there is a demand for reducing or eliminating friction losses in synchronization devices which are provided in a range gearing where the low-range and the high-range synchronization ring is provided on the same side in relation to the clutch sleeve, as well as for simplifying manufacture and assembly of the arrangement. This is also a principal object of the invention described below.

SUMMARY OF INVENTION

Devices configured according to the present inventive teachings are based on synchronization devices of the type described hereinabove and which are also referred to in the art as being the locking ring versions of the so-called Borg-Warner-synchronization type. Such devices comprise (include, but are not limited to) a synchronization device of the locking ring type, which are provided in a gear arrangement forming part of a vehicle transmission. The arrangement is intended to, on the one hand, synchronize the rotation speed between a shaft and a ring gear which is coaxially arranged in relation to the shaft and forms part of a planetary gearing, and on the other hand, forms part of the gear arrangement between the ring gear and a gear housing. The synchronization device comprises a first clutch ring which is fixed to the shaft and a second clutch ring which is fixed to the gear box housing. At least one synchronization ring is also included that cooperates with the clutch rings by means of friction surfaces and is axially displaceable; the synchronization ring is arranged to rotate with an axially displaceable clutch sleeve. The clutch sleeve is fixed to the ring gear. At least one spring suspension element is provided that transmits bearing force from the clutch sleeve to the synchronization ring during synchronization and gear changing by means of cooperation with first recesses in the clutch sleeve. The clutch sleeve, clutch rings, synchronization ring, and the spring suspension element are provided on one side of the ring gear. The synchronization device is characterized in that one of the synchronization rings is constructed together with an additional mirror-inverted synchronization ring in order to form a double synchronization ring. Further, the clutch sleeve during its axial movement for gear engagement separates the friction surfaces in the synchronization device to the gear which resultingly become disengaged because at least one second recess is provided on the double synchronization ring and the spring suspension element cooperates with the second recess as well.

In this way, apart from the advantage regarding elimination of friction losses due to trailing synchronization rings, there is also the benefit make possible by the reduction in the number of included parts in a gear arrangement.

BRIEF DESCRIPTION OF DRAWINGS

The present invention(s) are further described below with reference to the annexed drawings that are utilized to exemplify preferred embodiment(s) thereof and associated technical background. The figures include the following:

FIG. 2 is a partial cross-sectional, partial cutaway view showing an embodiment of the invention where two synchronization rings are constructed together into one double synchronization ring and provided in a range gearing of the planetary gearing type.

DETAILED DESCRIPTION

Figure 1:
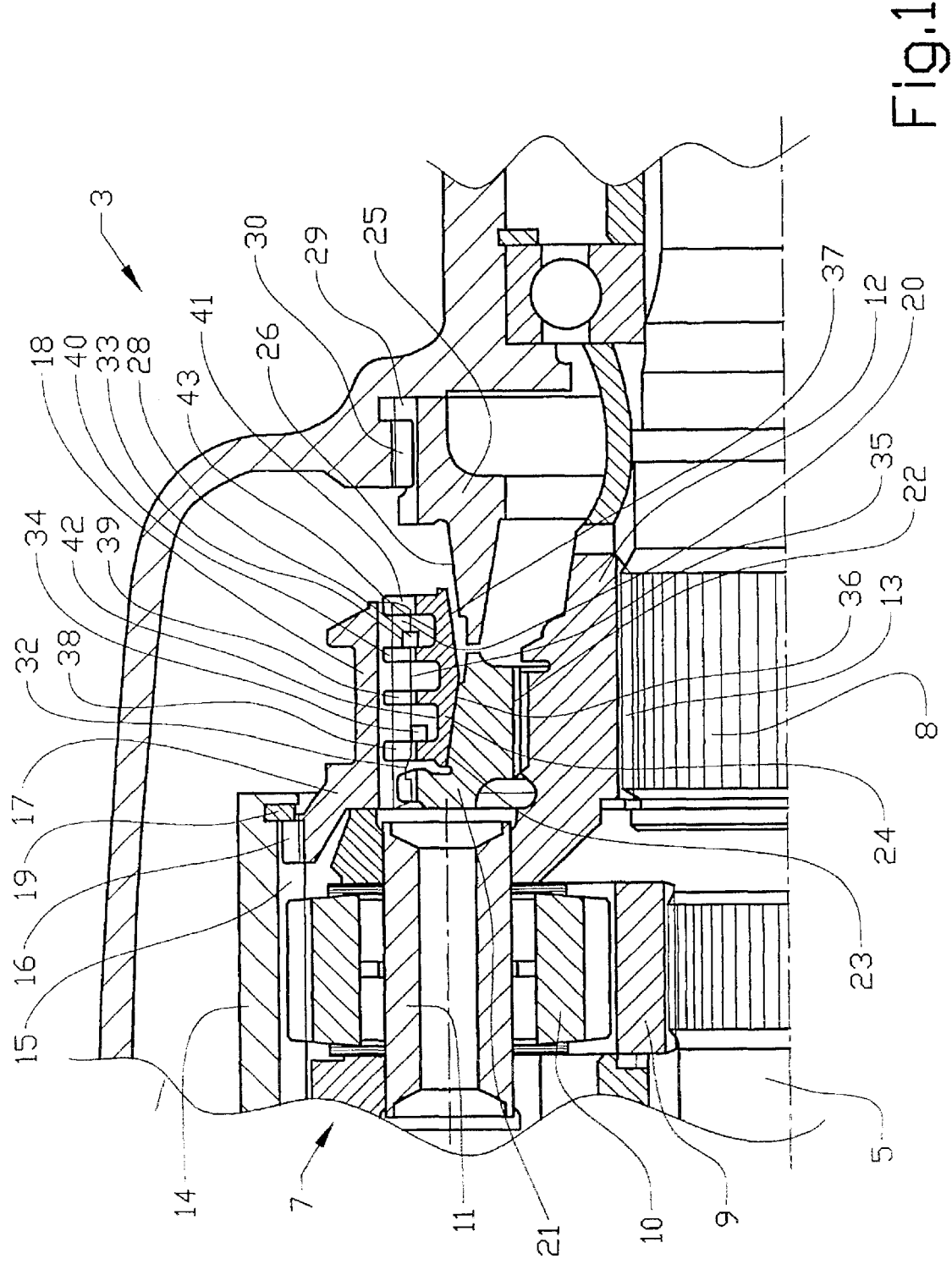
FIG. 1 is a partial cross-sectional, partial cutaway view showing an embodiment of the invention in which two synchronization rings are constructed together into one double synchronization ring and with one recess and a spring suspension element, per clutch ring, provided in a range gearing of the planetary gearing type.

The embodiments shown in FIGS. 1 and 2 correspond in principle to the range gear box shown in SE document 450944 apart from the parts which are special for the invention. Thus, reference numeral 3 indicates the range gear housing. The main gear box (not shown) has an output shaft 5, which inserts into the range gear box's housing 3. The shaft 5 forms the range gear box's input shaft, which via a planetary gearing, which is generally indicated with the reference numeral 7, is connected to an output shaft 8 which is provided with a flange for connection to the vehicle's universal driving shaft (not shown).

The planetary gearing arrangement 7 comprises a sun pinion 9 that is fixedly connected with the input shaft 5. The sun pinion 9 engages planet wheels 10, which are mounted on shafts 11 supported by a planet carrier 12 that is non-rotatably fixed to the output shaft 8 via a spline coupling 13. The planet wheels 10 engage with a ring gear 14, which has internal teeth 15 disposed in engagement with external teeth 16 on a ring-shaped flange 17, and which is formed in one piece with a clutch sleeve 18. A locking ring 19 in a groove in the ring gear 14 fixes the clutch sleeve 18 and the ring gear 14 axially in relation to each other. The sleeve 18 is axially displaceable by means of a shifting fork that is connected to the vehicle's gear mechanism.

The clutch sleeve 18 has internal teeth 20, which in the position shown in FIG. 1 engage with corresponding teeth on a clutch ring 21 which via a spline coupling 22, is non-rotatably connected with the hub of the planet carrier 12. The clutch ring 21 is formed with a synchronization cone 23, that supports a double synchronization ring 24 in engagement with the teeth 20 of the clutch sleeve 18. A correspondingly toothed clutch ring 25, with synchronization cone 26, is fixed to the rear gable of the range gear housing 3. The clutch ring 25, with external teeth 29, engages in the internally formed teeth 30 of the house 3. The thus formed double synchronization ring results in the number of parts being reduced and provides a simplified assembly over previously known solutions.

The teeth 20 of the clutch sleeve 18 have first recesses 32 and 33, which are each intended to receive a ring-shaped spring 28 and 34, the purpose of which is to transmit the bearing force from the sleeve 18 to the double synchronization ring 24 during synchronization and gear changing. In principle, the first recesses 32 and 33 form a pair of ring-shaped grooves in which the respectively associated springs 28 and 34 are pressed in and out of during gear changing. During the gear changing movement, the springs are compressed (i.e. tightened) by the ridge 35 formed between the first recesses 32 and 33. In the recesses 32 and 33, the axial surfaces against the ridge 35 are arranged with an inclined angle is adjusted to the synchronization in order to provide that the movement of the respective garter spring out of the first recesses 32 and 33 shall take place during a certain axial bearing force. The garter springs 34 and 28 can also be provided with a correspondingly angled edge surface. In order to achieve optimal synchronization, the inclination of the edge surfaces are adjusted to the respective synchronization device.

In each end on the internal side (as seen from a radial perspective) of the double synchronization ring 34, cone-shaped friction surfaces 36 and 37 are arranged which cooperate during synchronization with cone-shaped friction surfaces 23 and 26 corresponding to each clutch ring 21 and 25. On the external side of the double synchronization ring 24, bars 38, 39, 40 and 41 are arranged for conveying the double synchronization ring 24. The bars 38, 39, 40 and 41 can be compared to teeth, which engage with corresponding teeth 20 on the clutch sleeve 18. The bars secure and assure that the double synchronization ring 24 rotates with the clutch sleeve 18. The clutch sleeve 18 is, however, axially displaceable in relation to the double synchronization ring 24. On the double synchronization ring 24 between the respective bars 38 and 39, and 40 and 41, second recesses 42 and 43, are respectively provided and that each run around the entire circumference of the double synchronization ring 24. The dimensions of the respective second recesses 42 and 43 are determined by the dimensions of the corresponding garter spring 34 and 28 so that there is room for the respective garter spring when it is positioned in its compressed position; i.e., on the ridge 35 as exemplified by garter spring 34 in FIG. 1.

FIG. 1 discloses a range gearing (range gear arrangement) in which the high-range gear is engaged; that is, the ring gear 14 is engaged to rotate with the output shaft 8. When the driver selects the low-range gear by means of a gear-changing device, an axial force is transmitted to the clutch sleeve 18 in a known manner, and which causes the clutch sleeve 18 to move to the right in FIG. 1. The sleeve 18 is first disengaged from the teeth of the clutch ring 21. Both garter springs 28, 34 follow the clutch sleeve 18 in its movement to the right in FIG. 1. The garter spring 34 is situated in its compressed position, (i.e., tightened) upon the ridge 35 and the garter spring is situated in the recess 33. When the clutch sleeve 18 is moved to the right, it brings the double synchronization ring 24 with it until the friction surfaces 26 and 37 meet, after which the garter spring 28, by means of an inclined angle between the groove 33 and the ridge 35 on the clutch sleeve 18, provides an axial force which acts in the recess 43 on the axial surface against bars 41. The axial force presses the friction surfaces 37 and 26 together and synchronization and engagement takes place in the same manner as for a single synchronization ring as in, for example, SE document 450944 B1. After engagement, recesses 42 and the axial force against bars 39 assure that the friction surface 36 of the double synchronization ring 24 does not come into contact with corresponding friction surface 23. Due to the fact that the friction surfaces are not be in contact with each other, no friction losses or unnecessary wear will ensue.

A corresponding course of events takes place when the clutch sleeve 18 moves from low-range position to high-range position which would be exemplified by displacement to the left in FIG. 1.

In the embodiment configured and exemplarily illustrated in FIG. 2, two corresponding garter springs are reduced to one single garter spring 46. In this manner, the number of included parts is further reduced and manufacture and assembly has been resultingly simplified, yet with maintained function. The recess 49 is adjusted to the distance between the first recesses 47 and 48 in order to provide that the garter spring 46 is able to detain the double synchronization ring 45 after engagement and thereby prevent contact between friction surfaces for non-engaged gear positions.

The synchronization device according to the invention with double synchronization ring can also be provided in front of the planetary gearing; that is, between the vehicle's main gear box and the planetary gearing in the range gear box. In this case, one of the clutch rings is fixed to the input shaft or the planet carrier and the other clutch ring is fixed to the range gear housing, respectively.

It should also be appreciated that instead of garter springs, it is alternatively possible to use other types of springing elements in order to provide axial movement of the synchronization ring.

What is claimed is:

1. A synchronization arrangement of a locking ring type provided in a gear arrangement of a vehicle transmission comprising:

a synchronization device configured to synchronize rotation speed between a shaft (5, 8) and a ring gear (14) which is coaxially arranged in relation to the shaft and forms part of a planetary gearing (7), the synchronization device is located between the ring gear (14) and a gear housing (3) forming part of the gear arrangement;

the synchronization device further comprises a first clutch ring (21) fixed to the shaft (5, 8) and a second clutch ring (25) fixed to the gear box housing (3);

at least one synchronization ring (24, 45) cooperatively arranged with the clutch rings by means of friction surfaces (23, 36, 26, 37) and which is axially displaceable, the synchronization ring being arranged to rotate with an axially displaceable clutch sleeve (18) which is fixed to the ring gear;

at least one spring suspension element (28, 34, 46) which transmits bearing force from the clutch sleeve to the synchronization ring during synchronization and gear changing by means of cooperation with first recesses (32, 33, 47, 48) in the clutch sleeve;

the clutch sleeve, the clutch rings, the synchronization ring and the spring suspension element being provided on one side of the ring gear (14);

one of the synchronization rings (24, 45) being constructed together with a mirror-inverted synchronization ring thereby forming a double synchronization ring (24, 45) and wherein the clutch sleeve (18), during axial movement for gear engagement separates the friction surfaces (23, 36, 26, 37) in the synchronization device from the gear which becomes disengaged because at least one second recess (42, 43, 49) is provided on the double synchronization ring (45) and the spring suspension element (46) cooperates with the second recess (42, 43, 49).

2. The synchronization arrangement as recited in claim 1, wherein only one second recess (49) with axial surfaces is provided on the double synchronization ring (45) and only one spring suspension element (46) cooperates with the second recess (49) and the first recesses (47, 48).

3. The synchronization arrangement as recited in claim 1, wherein synchronization is provided in a range gearing, which includes a planetary gearing (7).

4. The synchronization arrangement as recited in claim 1, wherein the spring suspension element is constituted by a garter spring (28, 34, 46).

5. The synchronization arrangement as recited in claim 1, wherein the second recesses (42, 43, 49) are provided in at least one bar (38, 39, 40, 41) for conveying the synchronization ring and where the bar is arranged on the synchronization ring.

* * * * *